United States Patent
Beam, III

(12) 
(10) Patent No.: US 7,083,129 B2
(45) Date of Patent: Aug. 1, 2006

(54) WOOD CHIPPER HAVING AN INFEED CHUTE SAFETY DEVICE

(75) Inventor: Dennis A. Beam, III, Shelby, NC (US)

(73) Assignee: Reasonable Solutions, Inc., Shelby, NC (US)

( * ) Notice: Subject to any disclaimer, the term of this patent is extended or adjusted under 35 U.S.C. 154(b) by 92 days.

(21) Appl. No.: 09/821,904

(22) Filed: Mar. 30, 2001

(65) Prior Publication Data

US 2002/0139877 A1    Oct. 3, 2002

(51) Int. Cl.
*B02C 25/00* (2006.01)

(52) U.S. Cl. ........................... 241/37.5; 241/92
(58) Field of Classification Search ........... 144/176; 241/92, 37.5
See application file for complete search history.

(56) References Cited

U.S. PATENT DOCUMENTS

| | | |
|---|---|---|
| 2,030,758 A | 2/1936 | Naturkacz |
| 2,880,942 A | 3/1959 | Hall et al. |
| 3,182,917 A | 5/1965 | Tamny et al. |
| 3,989,198 A | 11/1976 | Blasko |
| 4,442,877 A | 4/1984 | Uitermarkt |
| 5,137,219 A * | 8/1992 | Morey .............. 241/92 |
| 5,667,152 A | 9/1997 | Mooring |
| 5,988,539 A | 11/1999 | Morey |
| 6,000,642 A | 12/1999 | Morey |

* cited by examiner

*Primary Examiner*—Mark Rosenbaum
(74) *Attorney, Agent, or Firm*—Kilpatrick Stockton LLP

(57) ABSTRACT

A waste reducing device, such as a wood chipper, having an infeed chute, a powered feed system, a powered cutting system, a discharge chute, and a safety device including an elongated structure positioned outside of and adjacent to the infeed chute of the wood chipper, the elongated structure movable vertically downward and radially inward towards the infeed chute between a plurality of positions, and an actuator operably connected to the elongated structure, the actuator having a plurality of operable positions corresponding to the plurality of positions of the elongated structure. The plurality of operable positions of the actuator permitting, interrupting, or reversing the motive operation of the powered feed and cutting systems of the wood chipper.

20 Claims, 4 Drawing Sheets

WOOD CHIPPER HAVING AN INFEED CHUTE SAFETY DEVICE

FIELD OF THE INVENTION

The present invention relates generally to a controlled feed device having an associated safety device and, more specifically, to a waste reducing device, such as a wood chipper, having an infeed chute safety device.

BACKGROUND OF THE INVENTION

Wood chippers are used to reduce branches, trees, brush, and other bulk wood products into small wood chips. A wood chipper typically includes an infeed chute, a feed system for controlling the feed rate of wood products into the chipper, a wood chipping mechanism, a drive system for powering the feed system and the chipping mechanism, and a discharge chute. The infeed chute is typically a funnel-shaped conduit with a wide opening which tapers towards the feed system, converging the wood products towards the chipping mechanism. Through the operation of the feed system, wood products are brought into contact with the chipping mechanism, which grinds, flails, or cuts the wood products into small pieces. These wood chips are propelled into the discharge chute and expelled from the wood chipper. Wood chippers, if operated incorrectly, are potentially dangerous devices. The chipping mechanism typically rotates at high speeds, producing the high torque necessary to chip wood products. The feed system, located at the narrowest point of the infeed chute, is a dangerous area which may catch an operator's clothing or, more importantly, an operator's limb if he or she improperly reaches into the infeed chute during operation of the wood chipper.

Existing wood chippers incorporate a number of safety devices designed to prevent such accidents and interrupt or reverse chipper motive operation should they occur. Such devices include, for example, warning labels, a safety bar which an operator may push, in the feed direction of the wood chipper, if he or she becomes caught by the feed system or cutting mechanism, and various cords/handles which hang inside the infeed chute. Although marginally effective, these safety devices suffer from the fact that their effectiveness is limited by the inattentiveness of an operator and that they are difficult to operate in an emergency situation.

BRIEF SUMMARY OF THE INVENTION

The present invention overcomes the aforementioned shortcomings and provides a wood chipper safety device that is effective and easy to operate in an emergency situation, thus preventing or minimizing operator injury. In one embodiment, a wood chipper safety device includes an elongated structure positioned outside of and adjacent to the infeed chute of a wood chipper, the elongated structure movable vertically downward between a plurality of positions, and an actuator operably connected to the elongated structure, the actuator having a plurality of operable positions corresponding to the plurality of positions of the elongated structure. The plurality of operable positions of the actuator permit, interrupt, or reverse the motive operation of the powered feed and cutting systems of the wood chipper.

In another embodiment, a waste reducing device, such as a wood chipper, having an infeed chute, a powered feed system, a powered cutting system, and a discharge chute includes an elongated structure positioned outside of and adjacent to the infeed chute of the wood chipper, the elongated structure movable vertically downward between a plurality of positions, and an actuator operably connected to the elongated structure, the actuator having a plurality of operable positions corresponding to the plurality of positions of the elongated structure. Again, the plurality of operable positions of the actuator permit, interrupt, or reverse the motive operation of the powered feed and cutting systems of the wood chipper.

DETAILED DESCRIPTION OF THE INVENTION

Figure 1:
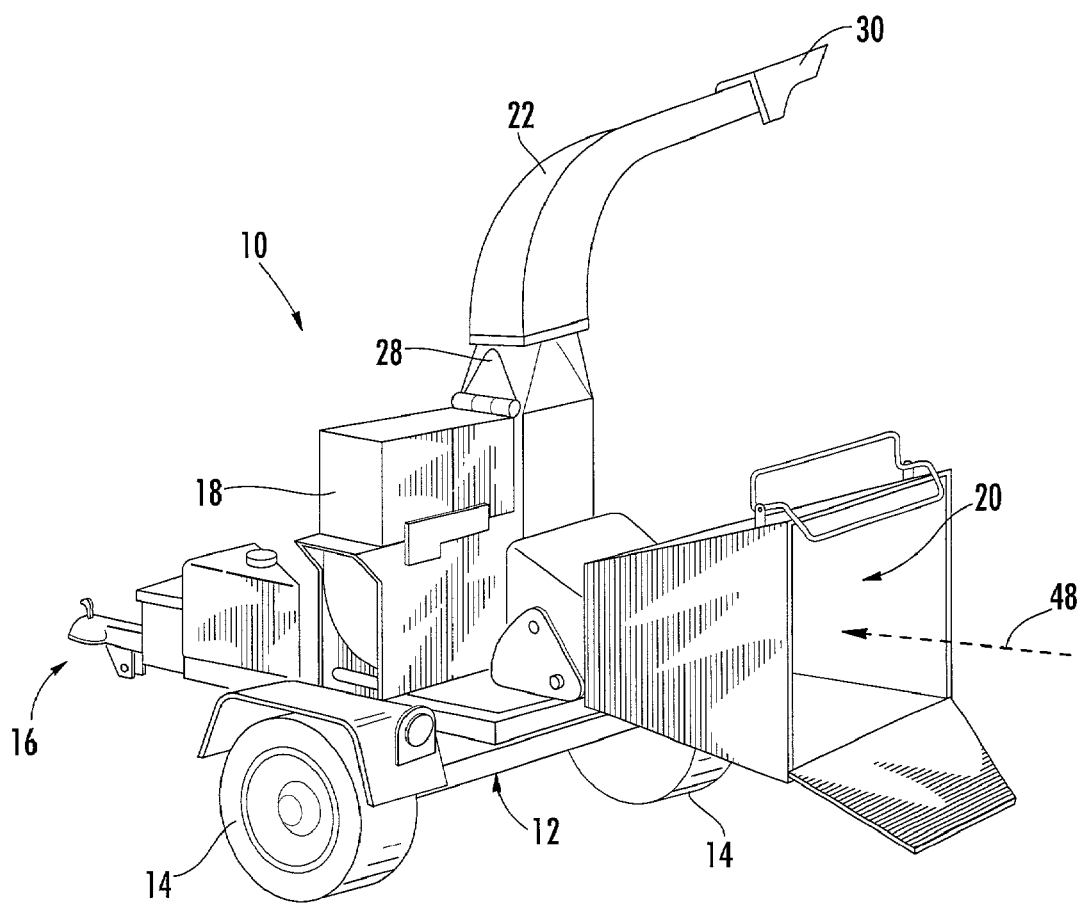
FIG. 1 is a perspective view of one embodiment of a wood chipper.
Figure 2:
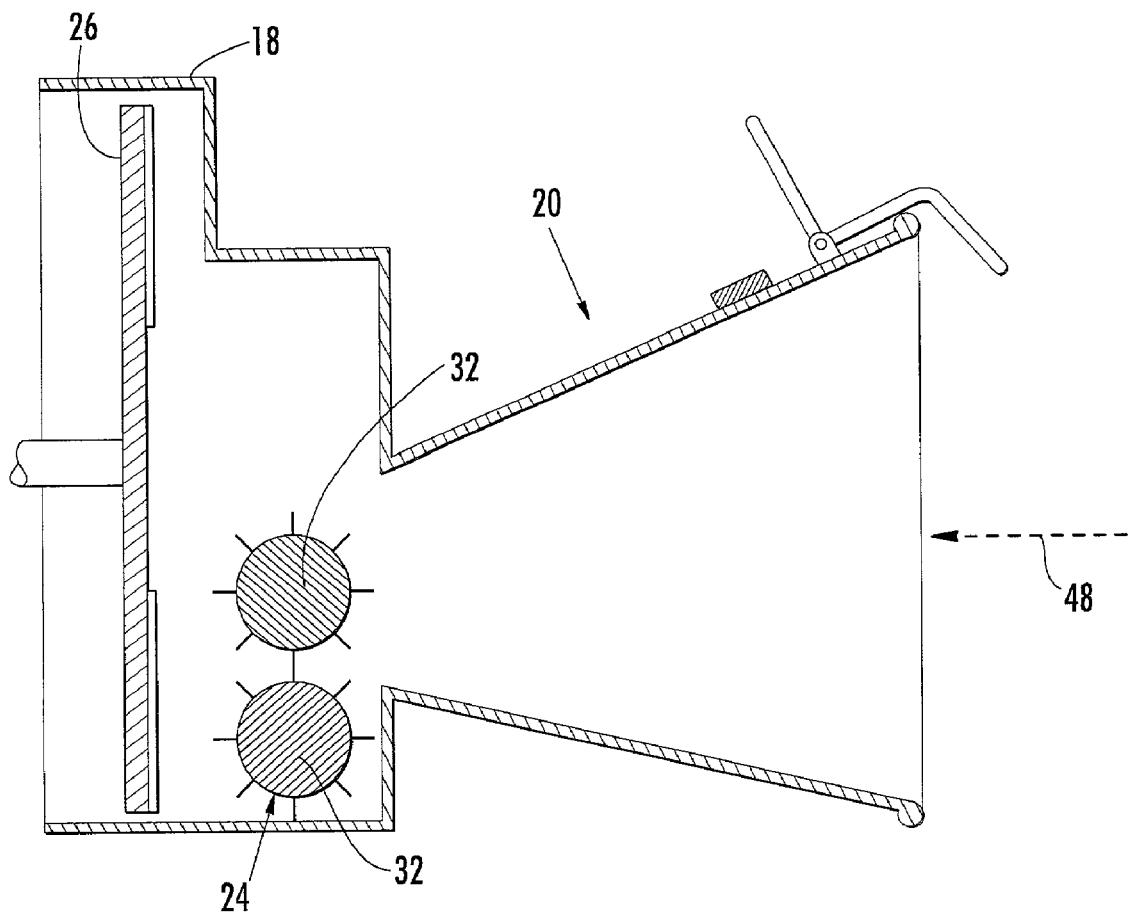
FIG. 2 is a cross-sectional side view of the infeed chute of the wood chipper of FIG. 1.

Referring to FIGS. 1 and 2, in one embodiment, a wood chipper 10 includes a frame 12 supported by a pair of wheels 14 and a conventional trailer hitch 16. The trailer hitch 16 allows the chipper 10 to be towed by a vehicle. A chipper hood 18, an infeed chute 20, and a discharge chute 22 are supported on the frame 12. An internal combustion engine may also be supported on the frame 12 for providing rotational energy to both a feed wheel system 24 and a cutting blade 26. The chipper hood 18 encloses the rotary cutting mechanism or blade 26 to prevent high-velocity pieces of wood from exiting the wood chipper 10 before being expelled through the discharge chute 22. A swivel bracket 28 may be mounted between the chipper assembly 18 and the discharge chute 22, allowing the discharge chute 22 to be to be rotatably aligned to expel wood chips in a desired direction. Additionally, the discharge chute 22 may include an adjustable deflector 30 mounted at the discharge chute exit for allowing further control over the direction of the exiting wood chip stream.

The internal combustion engine is generally operated such that the rotary cutting blade 26 rotates at a high velocity, while the feed wheels 32 rotate relatively slowly. In operation, branches, trees, brush, and other bulk wood products are fed into the infeed chute 20, in the feed direction 48, and captured between the opposed, rotating feed wheels 32. The wood products are thus advanced until they encounter the rotary cutting blade 26. The cutting blade 26 reduces the bulk wood products into chips which are expelled from the chipper 10 in a high-velocity air stream such that centrifugal force is imparted to the wood chips, driving them into the discharge chute 22. The wood chips enter the discharge chute 22 with sufficient linear velocity to be propelled an adequate distance from the wood chipper 10. Optionally, the swivel bracket 28 at the base of the discharge chute 22 and the deflector 30 at the exit of the discharge chute 22 may be adjusted to direct the exiting wood chip stream to a predetermined location away from the wood chipper 10.

Figure 3:
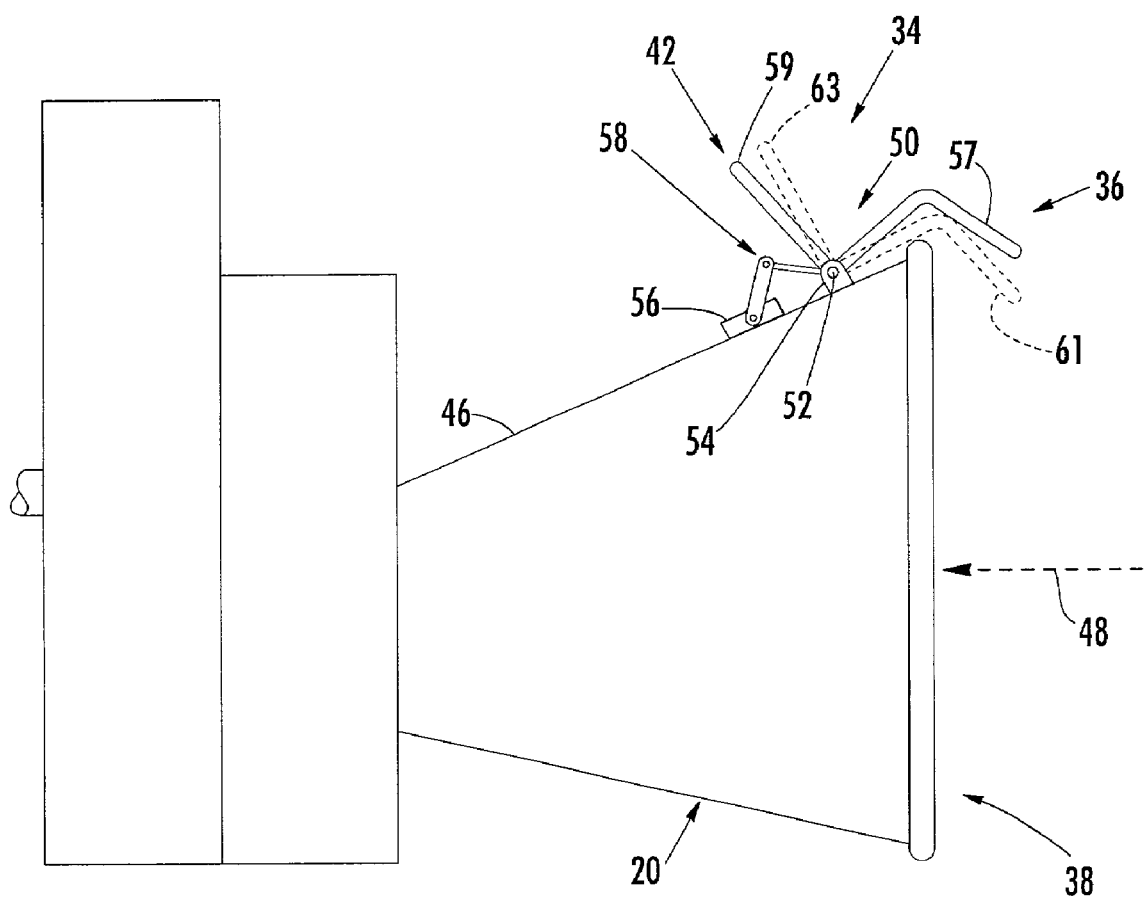
FIG. 3 is a side view of the infeed chute of the wood chipper of FIG. 1, incorporating the safety device of the present invention.
Figure 4:
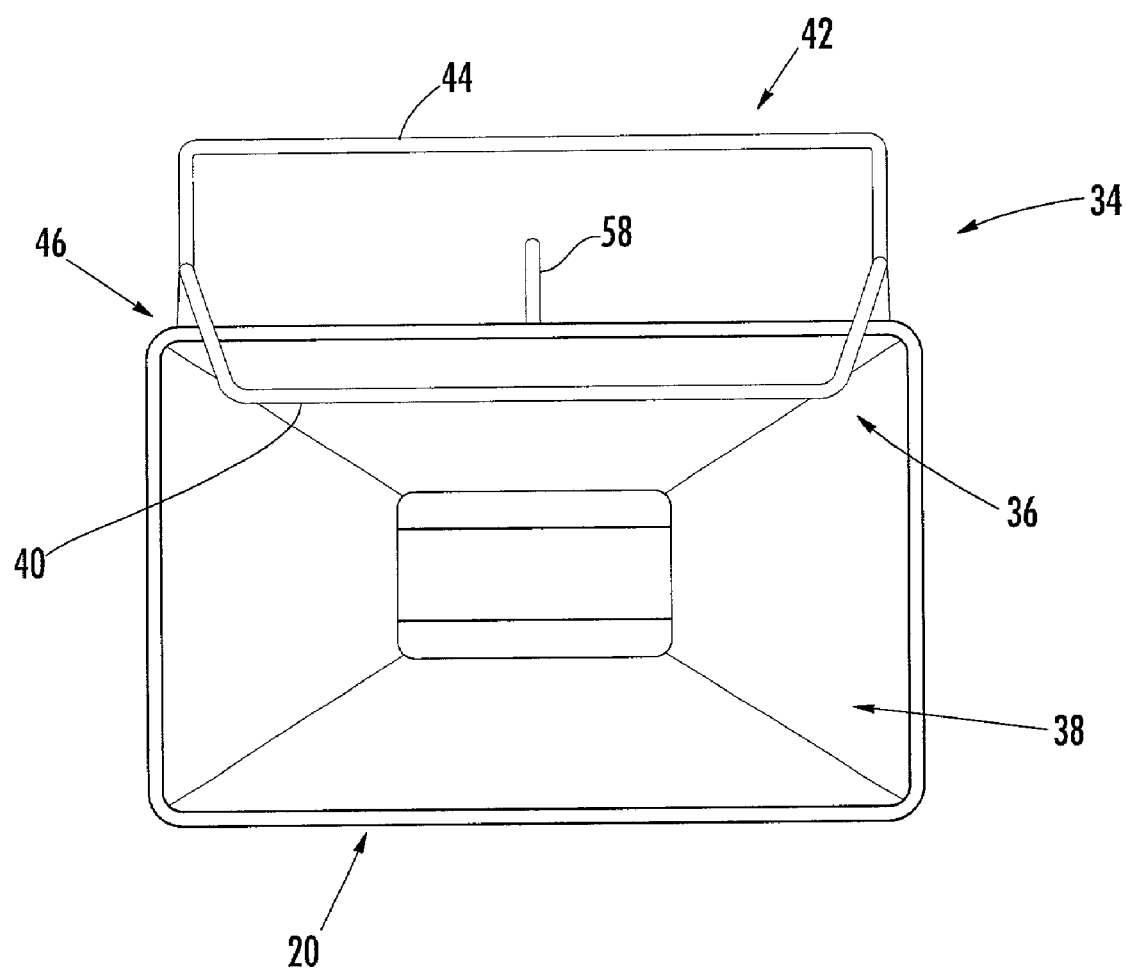
FIG. 4 is a front view of the infeed chute of the wood chipper of FIG. 1, incorporating the safety device of the present invention.

Referring to FIGS. 3 and 4, in one embodiment, the wood chipper safety device 34 of the present invention includes a first elongated structure 36, such as a bar, a rod, a handle, or a similar structure, positioned outside of and adjacent to the top of the opening 38 of the infeed chute 20. The first elongated structure 36 has a horizontally-extending portion 40 which extends substantially parallel to the upper portion of the opening 38 of the infeed chute 20, and in a spaced-apart relationship with the top 46 of the infeed chute 20. The first elongated structure 36 is movable vertically downward, and radially-inward towards the opening 38 of the infeed chute 20, between a plurality of positions. The second elongated structure 42 also has a horizontally-extending portion 44 which extends substantially parallel to, and in a spaced-apart relationship with, the top 46 of the infeed chute 20. The second elongated structure 42 is movable opposite the feed direction 48 of the wood chipper 10 (FIG. 1), and radially towards the opening 38 of the infeed chute 20, between a plurality of positions. The first elongated structure 36 may be rigidly attached to the second elongated structure 42 by means of a third elongated structure 50 positioned along the axis of rotation 52 of the first elongated structure 36 and the second elongated structure 42. The first elongated structure 36, the second elongated structure 42, and the third elongated structure 50 may be made of, for example, metal, plastic, or any other suitably rigid material. Alternatively, the first elongated structure 36 and the second elongated structure 42 may include a non-rigid but substantially non-extensible structure, such as a chain, cable, or rope. The third elongated structure 50 may be attached to the top 46 of the infeed chute 20 via one or more supports 54 that allow rotation, such as bearings or bushings and brackets. The bearings, bushings, and brackets 54 provide for independent or coordinated rotational movement of the first elongated structure 36 and the second elongated structure 42. The bearings, bushings, and brackets 54 may be made of, for example, nylon, plastic, metal, or any other suitable material.

The first elongated structure 36 and the second elongated structure 42 are operably connected to an actuator 56 which controls the powered feed and cutting systems of the wood chipper 10. Typically, these systems are hydraulically operated and controlled, however other operational systems may be utilized. The actuator 56 has a plurality of operable positions corresponding to the plurality of positions of the first elongated structure 36 and the second elongated structure 42. The actuator 56 may have a first operable position corresponding to a first position 57 (FIG. 3) of the first elongated structure 36 and a first position 59 (FIG. 3) of the second elongated structure 42, the first operable position of the actuator 56 permitting motive operation of the powered feed and cutting systems of the wood chipper 10. The actuator 56 may also have a second operable position corresponding to a second position of the first elongated structure 36 and a second position of the second elongated structure 42, the second operable position of the actuator 56 interrupting motive operation of the powered feed and cutting systems of the wood chipper 10. The actuator 56 may further have a third operable position corresponding to a third position 61 (FIG. 3) of the first elongated structure 36 and a third position 63 (FIG. 3) of the second elongated structure 42, the third operable position of the actuator 56 reversing motive operation of the powered feed and cutting systems of the wood chipper 10. Although three positions are discussed, there may be fewer or more positions but including a first, motive, position and one of a second stop or reverse position. As such, the elongated structures 36 and/or 42 may be rotated from a first position 57 and 59, which allows motive operation, to a third position 61 and 63, which reverses motive operation, with a second position that stops motive operation positioned therebetween. So, for example, an operator grabbing the first elongated structure 36 from within the infeed chute 20 simply pulls the first elongated structure 36 downward and rotationally inward, as would be the natural reaction of one trying to leverage oneself against the first elongated structure 36 to pull oneself out of the infeed chute 20. Similarly, an observer outside of the infeed chute 20 may push or pull the second elongated structure 42 rotationally inward, toward the opening 38 of the infeed chute 20 to stop or reverse the motive operation. Thus, by varying the position of the first elongated structure 36 and the second elongated structure 42, and thereby varying the operable position of the actuator 56, the operable state of the wood chipper 10 may be varied.

The first elongated structure 36 and the second elongated structure 42 may be operably connected to the actuator 56 via a linkage 58, such as one or more nylon, plastic, or metal bars or braces, which may, optionally, be notched at one or more ends. The linkage 58 is operable for holding the actuator valve 56 open, allowing hydraulic fluid to flow to the powered feed and cutting systems, permitting the motive operation of the wood chipper 10. As the first elongated structure 36 and the second elongated structure 42 are moved, the linkage 58 actuates the actuator 56 such that the flow of hydraulic fluid is interrupted or reversed, respectively interrupting or reversing the motive operation of the feed and cutting systems of the wood chipper 10. Alternatively, rather than utilizing a linkage, other mechanical, electrical, electro mechanical, optical, magnetic, etc. devices may be utilized to sense the position of the elongated structures 36 and 42 and switch the operable position of the actuator valve 56 or other control associated with the feed and cutting systems of the wood chipper 10.

As discussed above, the first elongated structure 36 and the second elongated structure 42 are advantageously positioned to improve the operational safety of the wood chipper 10. The first elongated structure 36 is positioned relative to the infeed chute 20 such that an operator caught in the feed or cutting systems, especially one falling with a backwards motion, may easily grasp the horizontally-extending portion 40 of the first elongated structure 36 and pull vertically downwards and/or radially-inwards towards the opening 38 of the infeed chute 20, stopping the motive operation of the wood chipper 10. The second elongated structure 42 is positioned relative to the infeed chute 20 such that an observer may easily grasp the horizontally-extending portion 44 of the second elongated structure 42 and push or pull opposite the feed direction 48 of the wood chipper 10 or radially-inwards towards the opening 38 of the infeed chute 20, also stopping the motive operation of the wood chipper 10.

Although the present invention has been described with reference to preferred embodiments, other embodiments may achieve the same or similar results. Variations in and modifications to the present invention will be apparent to those skilled in the art. For example, the wood chipper 10 may include any suitable controlled feed or waste reducing machinery used to chip, grind, cut, or otherwise reduce bulk products. While the preferred embodiments incorporate opposed, horizontally-aligned feed wheels 32, any feed system 24 may be incorporated into the present invention, including a single feed wheel or opposed, vertically-aligned feed wheels. Additionally, while the preferred embodiments incorporate hydraulic systems, the wood chipper 10 and its feed and cutting systems may be powered by any other suitable means including, but not limited to, electricity, gas, or diesel power. The following claims are intended to cover all such equivalents.

What is claimed is:

1. A wood chipper safety device comprising:
    a first elongated structure positioned outside of and adjacent to a top of an infeed chute of a wood chipper, wherein the first elongated structure is movable radially towards an opening of the infeed chute between a plurality of positions;
    an actuator operably connected to the first elongated structure, the actuator having a plurality of operable positions corresponding to the plurality of positions of the first elongated structure; and
    a second elongated structure positioned outside of and adjacent to the top of the infeed chute of the wood chipper, wherein the actuator is operably connected to the second elongated structure and wherein the second elongated structure is movable opposite a feed direction of the wood chipper between a plurality of positions.

2. The wood chipper safety device of claim 1, wherein the actuator has a first operable position corresponding to a first position of the second elongated structure, the first operable position of the actuator permitting motive operation of a powered feed and cutting system of the wood chipper.

3. The wood chipper safety device of claim 1, wherein the actuator has a second operable position corresponding to a second position of the second elongated structure, the second operable position of the actuator interrupting motive operation of a powered feed and cutting system of the wood chipper.

4. The wood chipper safety device of claim 1, wherein the actuator has a third operable position corresponding to a third position of the second elongated structure, the third operable position of the actuator reversing motive operation of a powered feed and cutting system of the wood chipper.

5. The wood chipper safety device of claim 1, wherein the first elongated structure is rigidly attached to the second elongated structure.

6. A wood chipper safety device, comprising:
    a first elongated structure positioned outside of and adjacent to a top of an infeed chute of a wood chipper, wherein the first elongated structure is movable radially towards an opening of the infeed chute between a plurality of positions;
    a second elongated structure positioned outside of and adjacent to the top of the infeed chute of the wood chipper, wherein the second elongated structure is movable radially towards the opening of the infeed chute between a plurality of positions;
    an actuator operably connected to the first elongated structure and the second elongated structure, the actuator having a plurality of operable positions corresponding to the plurality of positions of the first elongated structure and the plurality of positions of the second elongated structure; and
    a linkage operably connecting the actuator to the first elongated structure and the second elongated structure.

7. The wood chipper safety device of claim 6, wherein the actuator has a first operable position corresponding to a first position of the first elongated structure and a first position of the second elongated structure, the first operable position of the actuator permitting motive operation of a powered feed and cutting system of the wood chipper.

8. The wood chipper safety device of claim 6, wherein the actuator has a second operable position corresponding to a second position of the first elongated structure and a second position of the second elongated structure, the second operable position of the actuator interrupting motive operation of a powered feed and cutting system of the wood chipper.

9. The wood chipper safety device of claim 6, wherein the actuator has a third operable position corresponding to a third position of the first elongated structure and a third position of the second elongated structure, the third operable position of the actuator reversing motive operation of a powered feed and cutting system of the wood chipper.

10. The wood chipper safety device of claim 6, wherein the first elongated structure is rigidly attached to the second elongated structure.

11. A waste reducing device having a powered feed system, a powered cutting system, and an infeed chute, the waste reducing device comprising:
    a first elongated structure positioned outside of and adjacent to a top of the infeed chute, wherein the first elongated structure is movable radially towards an opening of the infeed chute between a plurality of positions;
    an actuator operably connected to the first elongated structure, the actuator having a plurality of operable positions corresponding to the plurality of positions of the first elongated structure; and
    a second elongated structure positioned outside of and adjacent to the top of the infeed chute, wherein the actuator is operably connected to the second elongated structure and wherein the second elongated structure is movable opposite a feed direction of the waste reducing device between a plurality of positions.

12. The waste reducing device of claim 11, wherein the actuator has a first operable position corresponding to a first position of the second elongated structure, the first operable position of the actuator permitting motive operation of the powered feed system and the powered cutting system.

13. The waste reducing device of claim 11, wherein the actuator has a second operable position corresponding to a second position of the second elongated structure, the second operable position of the actuator interrupting motive operation of the powered feed system and the powered cutting system.

14. The waste reducing device of claim 11, wherein the actuator has a third operable position corresponding to a third position of the second elongated structure, the third operable position of the actuator reversing motive operation of the powered feed system and the powered cutting system.

15. The waste reducing device of claim 11, wherein the first elongated structure is rigidly attached to the second elongated structure.

16. A wood chipper having a powered feed system, a powered cutting system, and an infeed chute, the wood chipper comprising:
    a first elongated structure positioned outside of and adjacent to a top of the infeed chute, wherein the first elongated structure is movable radially towards an opening of the infeed chute between a plurality of positions;
    a second elongated structure positioned outside of and adjacent to the top of the infeed chute, wherein the second elongated structure is movable radially towards the opening of the infeed chute between a plurality of positions;
    an actuator operably connected to the first elongated structure and the second elongated structure, the actuator having a plurality of operable positions corresponding to the plurality of positions of the first elongated structure and the plurality of positions of the second elongated structure; and a linkage operably connecting the actuator to the first elongated structure and the second elongated structure.

17. The wood chipper of claim 16, wherein the actuator has a first operable position corresponding to a first position of the first elongated structure and a first position of the second elongated structure, the first operable position of the actuator permitting motive operation of the powered feed system and the powered cutting system.

18. The wood chipper of claim 16, wherein the actuator has a second operable position corresponding to a second position of the first elongated structure and a second position of the second elongated structure, the second operable position of the actuator interrupting motive operation of the powered feed system and the powered cutting system.

19. The wood chipper of claim 16, wherein the actuator has a third operable position corresponding to a third position of the first elongated structure and a third position of the second elongated structure, the third operable position of the actuator reversing motive operation of the powered feed system and the powered cutting system.

20. The wood chipper of claim 16, wherein the first elongated structure is rigidly attached to the second elongated structure.

* * * * *